Sept. 13, 1955      B. L. HAVENS      2,717,998

RADIO-ECHO SYSTEM FOR PLOTTING COLLISION-COURSE

Filed May 16, 1944      6 Sheets-Sheet 1

INVENTOR.
BYRON L. HAVENS
BY *W. Glenn Jones*
ATTORNEY

2,717,998
RADIO-ECHO SYSTEM FOR PLOTTING COLLISION-COURSE

Byron L. Havens, Cambridge, Mass., assignor, by mesne assignments, to the United States of America as represented by the Secretary of the Navy Application May 16, 1944, Serial No. 535,852

10 Claims. (Cl. 343—5)

This invention relates to apparatus for the location and detection of distant objects by the radio-echo method and particularly to systems of such apparatus adapted for installation on a movable craft and adapted to facilitate the calculation of the course which the said craft should follow for the most direct approach to an object located with said apparatus. The present invention finds particular utility in connection with bombing of objects, such as surface vessels, from aircraft, and includes for that purpose means for determining the desired time for releasing the bomb.

In the bombing of vessels at sea by aircraft, a simple homing approach by the aircraft involves a number of difficulties, because the motion of the target and the occurrence of drift caused by wind often requires, in such cases, that the pursuing aircraft execute a relatively fast turn towards the end of the approach. Because of the high rate of turn at the end of the approach under such conditions, the simple homing approach is not generally suitable for an accurate bombing attack.

The apparatus of the present invention is adapted to correlate the normal function of a radio-echo type of locating and detecting system with the computing mechanism of a bombing sight in such a way that the radio-echo information can be directly utilized for the determination of a "collision course."

As a further refinement, the apparatus of the present invention is adapted to use the information obtained from a radio-echo type of locating system for the purpose of determining the proper moment for releasing a bomb in order to strike a particular target, and to provide automatic means for releasing such bombs. An especially advantageous procedure for "tracking" the target for the determination of the release time is included. The invention is explained below with reference to the drawings, in which:

Figure 1:
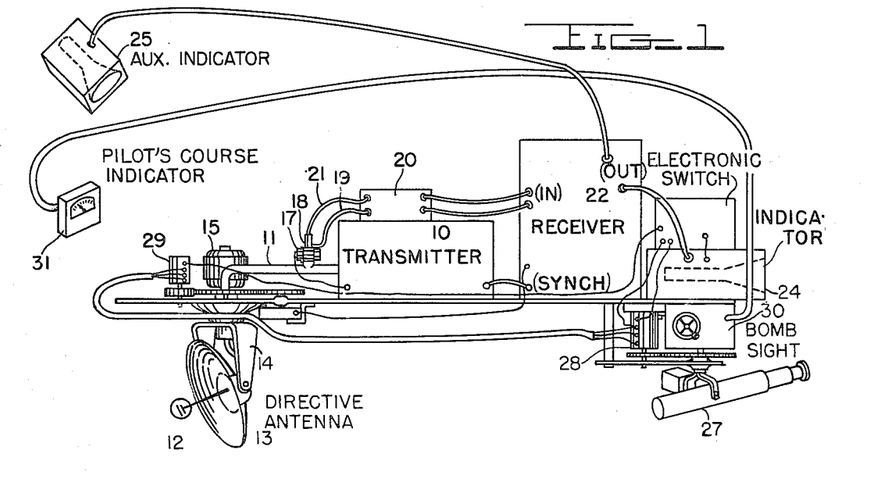
Fig. 1 is a diagrammatic side view illustrating a suitable disposition of equipment for operation in accordance with the present invention.

Fig. 1 shows a suitable arrangement of apparatus for the practice of the present invention. In this system, the transmitter 10 is connected through a suitable transmission line 11 with a directive antenna system including a radiating system 12 and a parabolic reflector 13. The directive antenna system 12, 13 is provided with a rotating mount 14 driven by the motor 15. The directivity of the antenna system 12, 13 may conveniently be greater or "sharper" in azimuth than in elevation.

The transmitter 10 is adapted to produce intermittent short-duration pulses of high-frequency radio energy. These pulses are separated by intervals sufficient to permit the reception of echoes resulting from the reflection by distant objects of a portion of the energy radiated by the system. The said echoes are intercepted and picked up by the directive antenna system 12, 13, the speed of the motor 15 being slow enough so that the change in orientation of the directive antenna system 12, 13 during the period between the transmitted pulse of radiation and the reception of an echo thereof is not enough to interfere appreciably with the reception of the echo. A convenient speed of revolution for the antenna system 12, 13 is a speed between 30 and 60 revolutions per minute.

Echo signals picked up by the antenna 12, 13 are transmitted to the transmission line 11 and therefrom into a branch transmission line leading through a protective electric breakdown discharge device 17 to a crystal detector 18, preferably operating according to the heterodyne principle. Locally generated oscillations are fed to the crystal detector 18 through the cable 19 from a local oscillator located within the unit 20. The unit 20 also includes one or two stages of amplification for amplifying the output of the crystal detector which is connected to the unit 20 through the wire 21. The output of the unit 20 is connected to a receiver 22 which provides further amplification and detection and also includes various synchronizing circuits, and the like, for measuring and/or indicating the period of time elapsing between the transmitted pulse and the received echo. The output of the receiver 22 is connected to one or more indicators which may be cathode ray tubes. One of these is shown at 24 and another, which may be referred to as the auxiliary indicator, is shown at 25. The indicator 24 is provided for the bombardier of the aircraft in which the system is mounted and is preferably a small cathode ray tube having a face about three inches in diameter and provided with electrostatic deflection. The indicator 25 is provided for general search purposes, such as the location of targets, terrain reconnaissance, navigational aid and so on, and may be mounted for viewing by the pilot or by some other member of the crew such as the navigator or the radio operator. No further reference will be made to the indicator 25, it being understood that any suitable method of data presentation may be employed in connection therewith.

The indicator 24 serves to show an expanded view of a portion of the space scanned by the revolving directive antenna 12, 13. The range scale of the indicator 24 is also expanded so that only signals falling within certain narrow limits of time (coming from objects within certain limits of range) are presented on the indicator 24, the time relation of the echoes viewed on the indicator 24 with respect to the transmission of pulses by the transmitter 10 being adjustable as more fully described below. The particular portion of the space scanned by the directive antenna 12, 13, which is viewed on the indicator 24 is controlled by the orientation of the telescope 27 of the bombing sight, the sweep circuits of the indicator 24 being so controlled that the echoes received from the direction in which the telescope 27 is pointing will appear on the vertical center line of the indicator tube. The telescope 27 controls the sweep circuit of the indicator 24 through a system of variable transformers including the variable transformer 28 which is geared to the azimuth bearing of the telescope 27 and the variable transformer 29 which is geared to the azimuth shaft of the antenna mount 14. The telescope 27 is connected in the usual way with computing apparatus adapted to indicate the future position of targets and similar information. This computing mechanism is indicated in a general manner at 30. The computing mechanism 30 usually includes a stabilizing mechanism for referring the measurements and calculations to a stable frame of reference which is independent of the various angular motions of the craft on which the apparatus is carried, so that its azimuth control shaft will determine true relative bearing (angular bearing relative to a fixed reference direction such a true north). If desired, stabilization against yaw without stabilization against roll may be employed, with some sacrifice of accuracy under conditions of severe rolling.

It is to be understood that although in Fig. 1 the variable transformer 28 is shown geared to the azimuth shaft directly connected to the telescope 27, the transformer 28 should be geared to a shaft which rotates in accordance with the bearing of the telescope 27 with respect to the aircraft and not the bearing with respect to some stabilized direction. The telescope 27 will normally be provided with a stabilized mount, so that the shaft indicating the bearing with respect to the aircraft will in actual fact be connected only indirectly with the immediate support of the telescope. With the arrangement just described, it is then possible to keep the positions of the indications on the indicator 24 independent of the yawing motion of the aircraft. Thus when the telescope 27 is held in a fixed position with respect to some reference axis such as the true north, the indication presented by the indicator 24 will be centered about the said fixed position, and when the telescope 27 is trained on a target being approached, the indication presented by the indicator 24 will be centered horizontally upon the direction of such target. Since the indicator 24 presents only range and azimuth information, further stabilization of the indication against such tossing of the aircraft as may result from atmospheric conditions and the like is not necessary, the range being substantially unaffected.

The motion of the telescope 27 resulting from training it on a target either optically or with reference to the indicator 24 is adapted to produce, in cooperation with the computing mechanism, an indication of the desired course for the most direct interception of the target, which may be referred to as a "collision course." Such indication may be conveniently presented to the pilot through a course indicator 31 which is adapted to show the turns necessary for putting the craft on the desired collision course.

In the manner described above in general terms, it is thus possible for a single observer to compute a collision course directly from radio-echo information without the necessity of optical sighting of the target. This constitutes an important advance over the operation of radio-echo equipment on patrol aircraft in accordance with the practice prior to this invention. The manner in which this desirable type of operation has been obtained is described more fully below.

Figure 2:
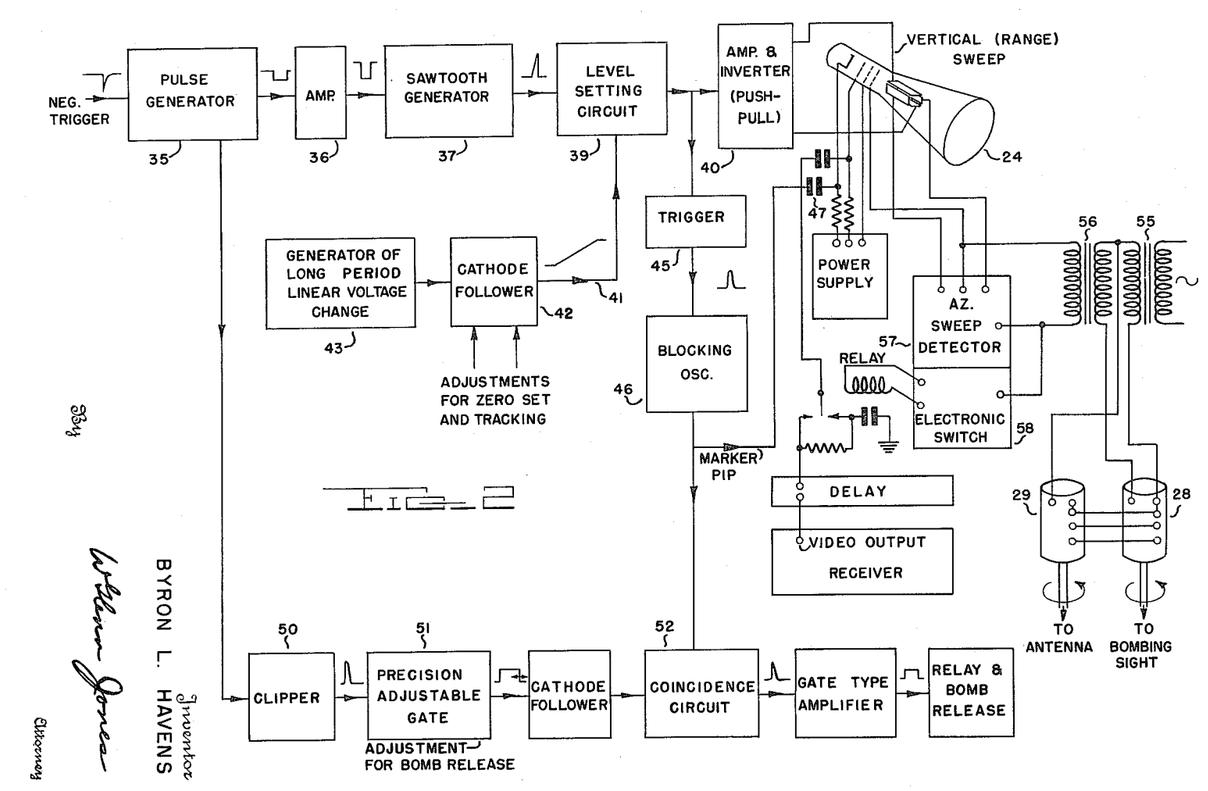
Fig. 2 is a block diagram showing a typical organization of apparatus in accordance with the present invention.

Figure 2 illustrates in a general way the organization of apparatus involved in one embodiment of the present invention. The various circuits are synchronized by a pulse generator 35. As shown in Fig. 2, the pulse generator 35 is tripped by a negative trigger impulse furnished by the transmitter at the time the transmitter operates. If desired, the converse type of operation might be provided, which is to say that the time of transmitter operation might be determined by a trigger pulse produced by the pulse generator and furnished to the circuit of the transmitter which controls the formation of the transmitted pulse. The pulse generator 35 furnishes a substantially rectangular pulse and this output pulse is provided to two different channels, the first channel being that shown in the upper part of Fig. 2 which relates to the range sweep circuit of the indicator 24, the second channel being that shown in the lower part of Fig. 2 which is adapted to function as an automatic bomb release control.

In the first mentioned channel, the pulse generator feeds an amplifier 36, which in turn controls a "saw-tooth" generator 37 in such a manner as to cause a saw-tooth type of pulse, which is to say a pulse with a substantially linearly rising voltage and an abrupt termination, to be produced for each input rectangular pulse. The saw-tooth generator 37 is of the usual type employed for the production of relatively fast linear sweeps for cathode ray tubes. The output of the saw-tooth generator 37 is put through a level-setting circuit 39 adapted to pick out a portion of the "saw-tooth" between certain particular voltage levels and further amplified by the amplifier 40 the output of which is provided through the vertical deflecting plates of the indicator 24 as shown on Fig. 2. The level-setting circuit 39, which is more fully described in connection with Fig. 5, determines the time at which the saw-tooth wave furnished to the amplifier 40 overcomes the amplifier bias, in accordance with a voltage provided through the wire 41. By controlling the time at which the sweep voltage furnished to the indicator 24 begins, the level-setting circuit thus controls the portion of the time scale which will be visible on the face of the indicator 24.

The voltage of the wire 41 is provided by a cathode follower stage 42. The cathode follower stage is provided with certain manual adjustments and is also connected to a circuit indicated at 43 which is adapted to generate progressive voltage change of very long duration, such as about 6 minutes. When the rate generator circuit 43 is inactivated, the level-setting circuit 39 may be controlled by manual adjustment associated with the cathode follower circuit 42. At a desired moment, the circuit 43 may be activated in order to provide a slow constant-rate increase of the voltage impressed upon the level-setting circuit through the wire 41. The rate of this change of voltage may be controlled by suitable adjustment provided in the cathode follower stage 42. These adjustments enable the voltage increase to be such as to compensate for the decrease in the range of the target resulting from the approach, so that a given target remains within the field of the indicator 24 during the approach. In the last stages of the approach the change in target range during level flight depart from the linear relation, but it has been found that the linear relation is sufficiently accurate in low-altitude approaches for all times up to the time at which it is desired to release a bomb. The apparatus of this invention is chiefly intended for low altitude operation, at altitudes of about 5000 feet or less.

The input voltage of the amplifier 40 is additionally fed to a trigger circuit 45 which operates under such conditions that it produces a sharp impulse or "trigger" when the input voltage reaches a predetermined value corresponding in time with the middle of the sweep produced by the amplifier 40 for the indicator 24. This impulse is used to trigger the blocking oscillator 46 which produces a definite pulse or "pip." A portion of the output of the blocking oscillator 46 is impressed through the condenser 47 on the cathode of the indicator 24, so that at the time the "pip" appears the electron beam in the indicator 24 will be slightly more intense than during no-signal conditions, thus producing a spot in the middle of each vertical sweep line and consequently forming a horizontal line across the indicator 24. Such a line is useful as a reference line for determining the rate at which a target is being approached.

The provision of this marker "pip" is an important feature of the apparatus whenever, as is usually the case, the antenna 13 picks up the target only a few times per minute. The marker remains on the indicator 24 even when the antenna is not "looking" at the target and thus continuously indicates the target position and permits comparison of a computed release point with the target position at practically any instant, whatever the orientation of the antenna at such instant.

Another portion of the output of the blocking oscillator 46 is furnished to the second channel operated by the pulse generator 35 for the purpose of controlling the bomb release of the aircraft. This second channel includes a clipper circuit 50 which produces a trigger impulse in response to the output of the pulse generator 35, a pulse generator adapted to produce a pulse of adjustable length in response to each trigger pulse, such pulse generator being generally known as a "precision adjustable gate" circuit and being indicated at 51. The output of the circuit 51 is then amplified and sent to a coincidence circuit 52 which is adapted to produce a signal, which may be a relatively sharp pulse, whenever a "pip" produced by the blocking oscillator 46 occurs within the period of the pulse produced by the precision adjustable gate 51. The output of the coincidence circuit 52 is amplified by a gate-type amplifier for the purpose of producing a pulse of somewhat longer duration which is better adapted for operating a relay. The output pulse of the gate-type amplifier is employed to operate a relay which in turn controls the bomb release of the aircraft. It is to be understood that the system of the present invention, but omitting the second channel operated by the pulse generator 35 and providing for automatic bomb release, may, if desired, by operated in connection with manually controlled bombing. Likewise, under certain conditions, such as in the case the target craft pursues an erratic course, the automatic bomb release of the apparatus of Fig. 2 may be inactivated in order to permit manual operation of the bomb release, or in order to postpone the bombing until a more opportune moment for the attack.

The azimuth or horizontal sweep circuits of the indicator 24 are controlled by circuits shown in a general way at the extreme right of Fig. 2. The variable transformers 28 and 29 are preferably of the type known in the trade as "Selsyns." One of the windings of each of these transformers is rotatable with respect to the field of the other windings. It is convenient to provide the stationary winding in the form of a three pole winding, either Δ or Y connected. The form of these windings is similar to that used for three-phase motors and generators, but in this case the windings are excited only with single-phase voltages, the amount of excitation of the different legs of the stator winding varying with different positions of the rotor. The rotor of the transformers 28 and 29 is conveniently provided with two-pole windings of the usual type.

Figure 3:
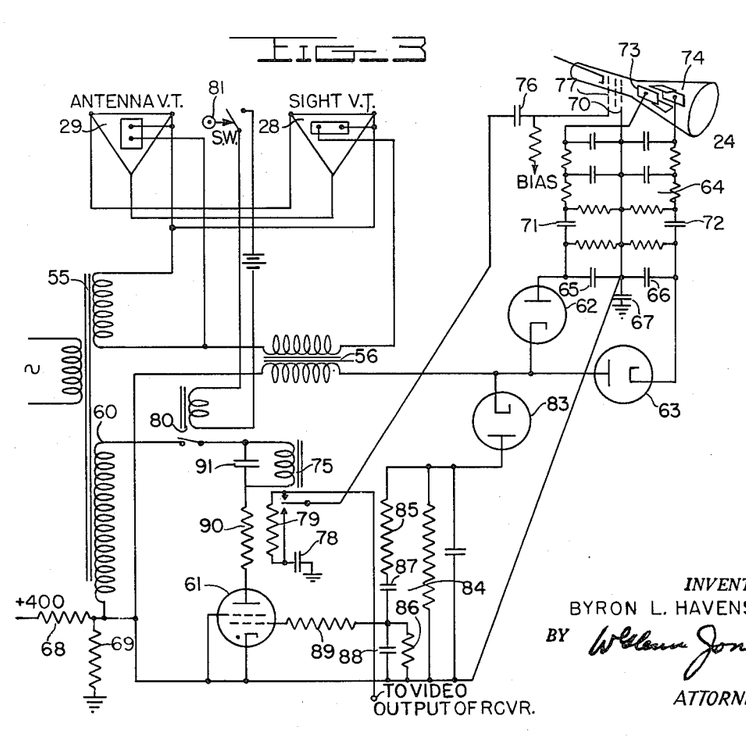
Fig. 3 is a circuit diagram relating to a portion of the apparatus shown in Fig. 2, including azimuth sweep circuits and the electronic switch.

The three terminals of the stator winding of the variable transformer 28 are simply connected to the corresponding terminals of the transformer 29, as shown in Figs. 2 and 3. The rotor of the variable transformer 29 is excited with alternating current provided from a suitable source such as the transformer 55. The rotation of the directive antenna system causes the rotor of the transformer 29 to rotate, which consequently causes a periodic fluctuation in the alternating current amplitude in the different legs of the stator winding. The field induced in the stator of the transformer 29 is effectively reproduced by the stator of the transformer 28. If the rotor of the transformer 28 is stationary, the changes in the field of the stator will cause certain fluctuations in the alternating current output of the rotor, and the phase of the fluctuations may be varied by changing the position of the rotor 28. The voltages generated in the rotor of the transformer 28 are caused alternately to buck and to boost the voltage provided by the transformer 55, thus introducing, when the antenna system is continuously rotated, a sinusoidal modulation of the alternating current originally provided. The sinusoidally modulated alternating current is fed through a transformer 56 to the azimuth sweep detector circuit and also to an electronic switch circuit. The azimuth sweep detector circuit is shown generally at 57 and may be any well-known type of detector circuit. It serves to rectify the modulated alternating current in the usual way, and to provide a suitably fluctuating potential on the horizontal deflection plate of the indicator 24.

In order that a portion of the space scanned by the antenna system may be spread over the entire space of the indicator 24, the variable transformers 28 and 29 are so geared to the bombing sight and to the directive antenna respectively that they perform two revolutions for each revolution of the sight or of the antenna, respectively. Other gear ratios may be used if desired. It has been found that a gear ratio as high as four to one provides a field that is inconveniently narrow, at least for antenna systems of moderate directivity and for fairly small indicator tubes. In order to avoid ambiguity of indication, it is desirable to prevent signals from the receiver from reaching the indicator 24 during all portions of the antenna revolution cycle except for one desired revolution of the transformer 29. It is also desirable that the center of the field presented on the indicator 24 will correspond to the direction in which the telescope 27 is pointed.

The desired interruption of the connection between the receiver and the indicator 24 is provided by the electronic switch circuit, shown generally at 58, which is operated by the output of the transformer 56 in cooperation with a suitable switch (not shown on Fig. 1 or 2) provided on the antenna mount 14. The circuit of the electronic switching arrangement is shown more fully in Fig. 3, to which reference will now be made.

In Fig. 3 the variable transformers 28 and 29 are shown at the upper left. The rotor windings of the variable transformers are represented by small rectangles provided with two terminals. In Fig. 3 the power input transformer 55 is shown with an additional winding 60 which furnishes power for the plate circuit of the electronic switch, which includes the gas discharge tube 61.

The detector circuit shown in Fig. 3 for rectifying the output of the transformer 56 is of the well-known "voltage-doubling" type and includes two rectifier tubes 62 and 63 and a filter circuit shown at 64. The filter circuit 64 is of the balanced type, with a center connection made to the common terminal of the input condensers 65 and 66. This common terminal is by-passed to ground by means of the condenser 67 and its DC potential is set by the voltage divider including the resistors 68 and 69 which is fed from a suitable source of voltage. It may be desirable to operate one of the beam-forming electrodes of the indicator tube 24 at this potential and accordingly a connection for that purpose is shown at 70. The filter circuit 64 includes series condensers 71 and 72, preferably having a magnitude of approximately one microfarad, thus permitting only the alternating current component of the output of the rectifier tubes to be passed on to the deflecting plates of the indicator 24, the D. C. potential level then being set by the voltage divider 68, 69. In consequence the deflection voltages applied by the filter circuit 64 upon the deflecting plate of the indicator 24 are "self-centering," each voltage varying symmetrically about the same average potential set by the voltage divider 68, 69.

Figure 4:
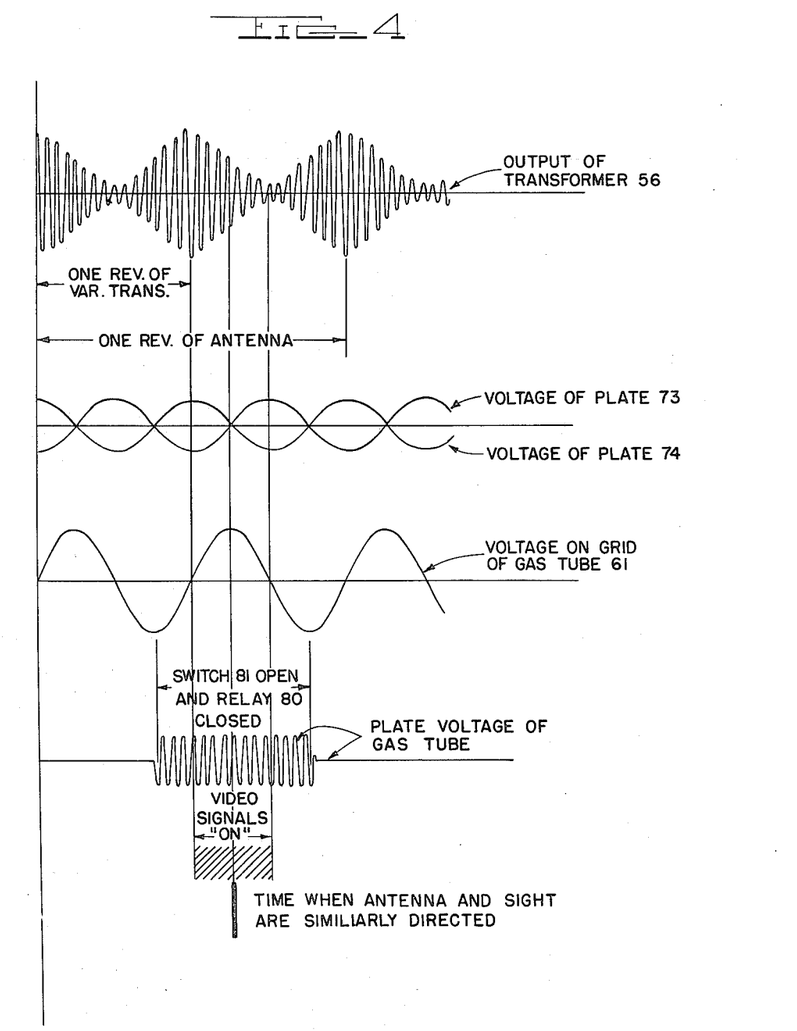
Fig. 4 is a theoretical diagram illustrating the operation of the circuit shown in Fig. 3.

The variation of the deflecting voltages with time and the relation of this variation to the output of the transformer 56 is shown in the first two plots of Fig. 4. As shown in Fig. 4, the voltage applied on the deflecting plate 73 is derived from the lower boundary of the modulation envelope of the wave shown in the first plot on Fig. 4 (the output of the transformer 56) and the voltage applied to the plate 74 of the indicator 24 is derived from the upper boundary of the said modulation envelope.

Although the sweep voltages applied to the deflecting plates 73 and 74 are continuously applied, the output of the receiver is applied to the signal grid of the indicator 24 only intermittently, in order that an unambiguous representation of a portion of the field scanned by the directive antenna can be presented on the tube 24. The time during which the receiver is connected with the signal grid circuit of the indicator 24 is controlled by the relay 75. When the relay 75 is in its upper position, which is to say that when the tube 61 is conducting, the video-frequency output of the receiver is connected effectively through the condenser 76 to the signal grid 77 of the indicator 24. When the relay 75 is in its lower position, which is to say when the tube 61 is non-conducting, the signal grid 77 is substantially at ground potential because of the by-passing effect of the condenser 78, and the portion of the video-frequency output of the receiver allocated to the indicator 24 is simply dissipated in the high resistance 79, which may conveniently have a value of approximately one megohm.

The plate circuit of the tube 61 is intermittently interrupted by the relay 80, which is controlled by the switch 81, which is in turn automatically operated by the revolution of the antenna system in such a manner as to close the switch for a desired half-revolution of the antenna, preferably the half-revolution which is directed forwardly with respect to the motion of the craft carrying the apparatus. When desired, the mounting of the switch 81 may be made rotatable and adapted to follow the rotation of the telescope 27 but normally only objects in forward direction are of interest for a collision approach, and the auxiliary indicator 25 provides sufficient indication of objects in other directions for general warning purposes. Consequently, it is convenient to fix the position of the switch 81 so that it activates the plate circuit of the tube 61 only during the forward half-revolution of the antenna system. If a gearing ratio between the antenna system and its variable transformer other than 1:2 is employed, a proportional adjustment in the portion of the cycle during which the switch 81 is open and the contacts of the relay 80 closed is of course to be made in order to avoid ambiguity. The switch 81 is preferably of a type known as a "microswitch" and may be operated by a suitable cam or similar mechanical device.

The grid voltage of the gas discharge tube 61 is obtained by half-wave rectification of a portion of the output of the transformer 56 by means of the rectifier tube 83 and filtering by a network 84 which is adapted to provide a voltage which is substantially 90 degrees out of phase with respect to the modulation envelope of the output of the transformer 56 as rectified by the rectifier 83. If desired, the rectifier 83 may be partially consolidated with the rectifier 62 by employing a rectifier tube having a single cathode and two separate anodes, one of these anodes being used in the sweep detector circuit, and the other being used to operate the grid circuit of the tube 61. The network 84 comprises the resistors 85 and 86, which may have the value of one megohm and two megohms respectively, and the condensers 87 and 88, which may each have a value of about one microfarad, and also a resistor 89, which may have a value of approximately 100,000 ohms. A small resistor 90, which may have a value of 100 ohms is provided in the plate circuit of the tube 61, and a by-pass condenser 91, which may have a value of two microfarads, is provided across the winding of the relay 75. The by-pass condenser 91 is desirable because the plate circuit of the tube 61 is fed with an alternating current provided by the transformer winding 60 and it is desired to provide a relatively steady current through the relay 75 when the contacts of relay 80 are closed.

In Fig. 4 the deflecting voltages of the plates 73 and 74 of the indicator 24 and the plate and grid voltages of the tube 61 are shown in a series of graphs having a common time scale, together with the output of the transformer 56 which appears in the top graph. Because of the 90° phase shift of the grid voltage of the tube 61 provided by the network 84, the maxima and minima of the grid voltage correspond in time with the instants of zero deflection voltage applied on the plates 73 and 74 of the indicator 24. The relative position of the rotors of the variable transformers 28 and 29 with respect to the orientation of the telescope 47 and of the directive antenna 12, 13, respectively, is so arranged that maxima of the voltage on the grid of the gas tube 61 occur when the telescope 27 is oriented in the same direction as the directive antenna (and in this case also when opposite orientation occurs). The operation of the gas tube 61 is limited to those of its grid voltage cycles which include the particular maxima occurring when the position of the directive antenna is pointing in the same direction as the telescope 27, on account of the interruption of the plate circuit of the gas tube during other grid voltage cycles, as shown on the fourth plot of Fig. 4. The bias of the gas tube 61 is so adjusted that the tube is conducting for positive half-cycles of grid voltage. Little or no negative bias on the grid of the gas tube 61 is necessary for this purpose when this gas tube is of the type known as 2050.

The relay 75 will be held in its upper position only during the positive half of the grid voltage cycles which coincide in time with the period during which the relay 80 is closed in the plate circuit of the tube 61. The time during which the relay 75 is in its upper position is shown by the shaded area on Fig. 4, there labeled "video signals 'on.'" As shown on Fig. 4, the time when the antenna and the sight are similarly directed occurs in the middle of this period and, as previously explained and shown, it occurs when the deflection voltage applied on the plates 73 and 74 is zero so that indications occurring at such moments will be presented on the vertical center line of the indicator tube 24. It is to be understood that if, as previously suggested, the position of the switch 81 is fixed and not movable according to the orientation of the telescope 27, the time relation of the periods when the relay 80 is closed with respect to the modulation envelope of the output of the transformer 56 and with respect to the sweep voltages and so on, will be varied when the orientation of the telescope 27 is changed, which is to say that the fourth plot of Fig. 4 will be displaced to the left or right relative to the other plots. In such case, the telescope 27 could be aimed as much as 45° on either side of the forward direction without moving the positive half-cycle of the grid voltage on the tube 61 (which has its maximum when the antenna is directed in the direction of the aiming of the telescope 27) beyond the limits of the period during which the relay 80 is closed, and even greater deviation of the telescope may be made (if desired) without serious interference with the presentation of the desired data, because as the telescope is deviated to angles greater than 45° with the forward direction, only the edge of the pattern is at first cut off by the operation of the switch 81 and the relay 80, and even at 90° half the pattern is still visible.

In practice it is rarely desired to deviate the telescope 27 more than about 25° from the forward direction.

It is to be noted that because of the sinusoidal nature of the horizontal sweep voltages, the field is relatively expanded in the center, in addition to the general expansion produced by the gear ratio between the directive antenna and the variable transformer 29. Very small changes in the bearing of a target may therefore be noted.

Figure 5:
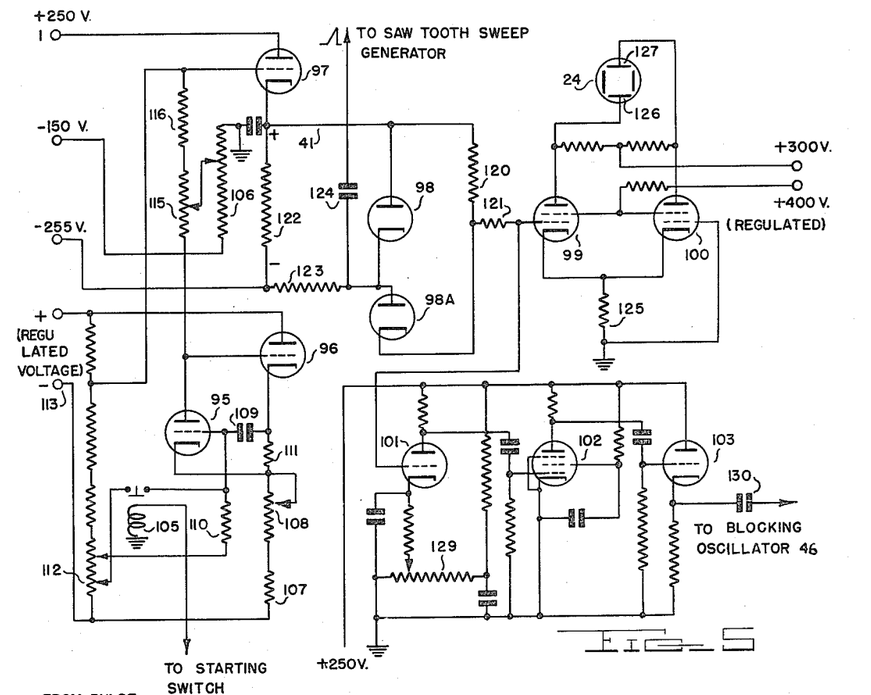
Fig. 5 is a circuit diagram relating to another portion of the apparatus shown in Fig. 2, including the long-period linear voltage change generator, the adjustable follower, the level-setting circuit, and certain amplifiers.

The circuit for maintaining a given target within the field of the indicator tube 24 during approach directed toward such target is shown in Fig. 5. Fig. 5 shows the circuit for generating a progressive voltage change over a relatively long period, comprising the tubes 95 and 96, a cathode-follower stage including the tube 97, a level-setting circuit including the diodes 98 and 98A, a push-pull range-sweep amplifier including the tubes 99 and 100 and a biased differentiating amplifier or "trigger-producing" circuit including the tubes 101, 102 and 103.

In the grid circuit of the tube 95 a relay 105 is provided of which the contacts are closed when no automatic range tracking of a particular target is desired. When these contacts are closed, the grid of the tube 95 is biased at such a voltage that the tube 95 is substantially non-conducting. Its anode is therefore at a relatively high voltage, and the grid of the tube 96 is therefore at a relatively high positive voltage so that the tube 96 is in its most conducting condition. A static equilibrium is reached and the output voltage of the cathode-follower 97 can be controlled entirely by adjustment of the potentiometer 106 which adjusts the bias of the grid of the tube 97. The potentiometer 106 thus serves for manual adjustment of the voltage level at which the circuit including the diodes 98 and 98A operate, as more fully explained below.

When the starting switch (not shown) is operated to open the contacts of the relay 105, the grid bias of the tube 95 is changed so that the tube 95 begins to conduct. Before the contacts of the relay 105 are opened, the condenser 109 will be in a charged condition, having a negative charge on the left-hand electrode which is connected to the grid of the tube 95 and a positive charge on the right-hand electrode which is connected to the cathode of the tube 96.

The power supply for this circuit is preferably adapted to furnish a voltage of very high constancy, and is not connected to ground, the only ground in the circuit being through one side of the potentiometer 106. This fact is important in the arrangement shown because it contributes to obtaining the type of operation described in connection with Fig. 8. The constancy of the power supply voltage is preferably regulated by an electronic type of voltage regulator. The right-hand electrode of the condenser 109 is charged as a result of cathode current of tube 96, which current will reach an equilibrium value when the condenser reaches a substantial positive charge voltage. When the contacts of the relay 105 are opened, the voltage of the grid of the tube 95 is caused to rise (the rate of rise being limited by the high resistance 110) and gradually the tube 95 begins to conduct. This causes the voltage at the anode of tube 95 to decrease, thus decreasing the grid voltage of the tube 96 and permitting the condenser 109 to discharge towards an equilibrium voltage for the cathode of the tube 96. The condenser thus tends to discharge through the registers 110, 107, 108 and 111 and part of the resistor 112. The greater part of the resistance in this circuit is in the high resistance 110 which may have a value of about 2 megohms. Because of the high value of this resistance, the discharge of the condenser 109 takes place over a long period because the condenser 109 has a relatively large value, which may be about 4 microfarads. The discharge of the condenser 109 gradually allows the grid of the tube 95 to increase its potential, thus gradually increasing the current of the tube 95 and decreasing the current of the tube 96, thus promoting further discharge of the condenser 109. This process takes place very slowly, however, because it is partially compensated by an increase of current in the resistors 107 and 108. Although these resistors are preferably quite small, and may have values of 1500 and 500 ohms respectively, the current in the resistor 107 and in the lower part of the resistor 108 produce a voltage drop raising the voltage of the cathode of tube 95. The movable contact on the resistor 108 may be adjusted so that a substantially constant voltage is maintained across the condenser 109. This will tend to produce a linear change of output voltage, the output voltage being taken off at the anode of tube 95. Thus the circuit may be adjusted to provide a high degree of linearity in the output. It will thus be seen that the provision of the resistors 107 and 108 is an important feature of this type of generator of long-period linear voltage change. It is to be noted that the variable resistor 108 may be used to provide slight non-linearity in either direction if desired.

The decrease in the current of the tube 96 also takes place quite slowly because as the grid voltage gradually becomes more negative, the reduced current in the cathode circuit causes the cathode also to become more negative, the resistor 111, which may have a resistance of approximately 50,000 playing the most important part in this respect. The change of current required to reach equilibrium with reduced grid voltage of the tube 96 is therefore quite small, so that the discharge rate of the condenser 109 is further slowed up.

The circuit just described is quite different from circuits in which a condenser is suddenly caused to charge or to discharge towards a fixed value of voltage. The value of voltage towards which the condenser 109 tends to discharge is in this case gradually changed as the discharge proceeds. The total time required to reach the final condition thus achieved by keeping the voltage of the discharge relatively low over the whole process is very much greater than if the final voltage conditions were immediately established and only the time constant of the resistor-condenser circuit were involved for controlling the rate at which the grid of the tube 95 reaches the equilibrium potential. In general, the time required for reaching equilibrium conditions after the contacts of the relay 105 are opened is approximately equal to the product of the amplification factor of the tube 95 and the time constant of the resistor-condenser circuit. This relation is only approximate because of the fact that the amplification factor of the tube 95 varies somewhat with the current in the tube, but it furnishes a useful basis for roughly predicting the behavior of a circuit of this sort. It will be seen that the change in the anode voltage of the tube 95 will be approximately $\mu$ times the change in the grid voltage in the tube 95 when the tube 95 begins to conduct, $\mu$ being the amplification factor of the tube. Since the tube 96 adjusts its cathode potential at a value substantially equal to that of the grid of tube 96, the change in voltage of the cathode of the tube 96 is also approximately $\mu$ times the change in the voltage between the grid and cathode of the tube 95. Thus the voltage across the resistor 110 is substantially limited to $$\frac{1}{\mu}$$

times the voltage across the resistor 111. This limits the current in the resistor 110 to $$\frac{1}{\mu}$$

times the current that would flow therein without the limitation thus provided, thus substantially multiplying by $\mu$ the time required to dissipate a given amount of charge in the condenser 109 through the resistor 110.

When a tube having an amplification factor of about 70 is provided for the tube 95, the effective time-constant of the circuit may be of the order of nine minutes. For the purpose of the apparatus here in question a linear change of voltage over a period of six or seven minutes is sufficiently long in duration.

The provision of the cathode follower tube 96 in the circuit just described has the advantage of providing isolation between the anode circuit of tube 95 and the discharge circuit of the condenser 109. Thus, although the voltage on the righthand plate of condenser 109 is about the same as that of the anode of tube 95, the fact that the current for resistor 111 does not pass through resistors 115 and 116 but is provided substantially without reaction on the anode circuit of tube 95 is advantageous and improves the operation of the device.

As previously pointed out, the change of voltage produced in the resistors 115 and 116, which is the output voltage of the circuit, is substantially linear in character. The amplitude of the change of voltage, which is to say the rate of change of the output voltage during the tracking operation, may be adjusted by adjusting the variable contact of the potentiometer 115. The voltage level at which the said change of voltage takes place may be adjusted by adjusting the variable contacts of the potentiometer 106. This arrangement of potentiometers has the advantage that correction of the rate adjustment simultaneously corrects for the displacement resulting from the previous error in the rate setting, as more fully described below.

The output of the linear voltage change circuit is provided to the level-setting circuit through the cathode follower stage which includes the tube 97. Because the circuits of the tubes 95 and 96 are not grounded except through the potentiometer 106, the gradual decrease in voltage of the anode of the tube 95, relative to the voltage of the anode supply and the accompanying increase in current through the resistors 115 and 116 will cause a gradual rise in the potential of the grid of the tube 97. This will increase the current passed by the tube 97 and raise the voltage of the cathode, which voltage is transmitted to the level-setting circuit by the wire 41.

After the contacts of the relay 105 have remained open for a sufficiently long time, a new equilibrium is set up with the tube 95 conducting and the tube 96 non-conducting, and in order to initiate another tracking operation, the relay contacts must be closed and then opened again. Upon the closing of the contacts of the relay 105, the normal condition of the circuit, in which the condenser 109 is charged, is rapidly reestablished because the high resistance 110 is shunted out of the charging circuit of the condenser 109. Only a few tenths of a second are necessary. The circuit is then ready for manual level-setting or for another tracking operation.

Instead of a vacuum tube circuit for producing a long-period linear change in voltage, other types of circuits may be used. Thus a linear potentiometer might be provided with an adjustable constant voltage thereacross and a constant-speed motor might be employed to move the movable contact of the potentiometer gradually so as to produce a long-period change in voltage. The vacuum-tube type of circuit has the advantages of saving weight, avoiding contact troubles and obtaining greater linearity of operation at low cost.

The operation of the level-setting circuit including the rectifier tubes 98 and 98A (which may, if desired, be provided as separate diode elements within a single vacuum tube envelope) may be described as follows. The resistor 123 has a very high resistance, such as about 2 megohms. It is found to have some stabilizing influence, although it is not entirely necessary, but its resistance is so high that its effect upon the behavior of the circuit is very small and may, except for the small stabilizing effect, be disregarded. When no saw-tooth waves are coupled through the condenser 124 to the circuit of Fig. 5, the voltage of the control grid of the tube 99 is determined by the voltage of the cathode of the cathode-follower tube 97. As previously pointed out, this voltage may be controlled manually, or may be controlled automatically by the circuits including the tubes 95 and 96. In general, the voltage of the cathode of the tube 97 will be negative by a considerable amount. Additional grid bias for the tube 99 is provided by the resistor 125 in its cathode circuit. This additional bias is such that the tube 99 will be substantially cut off for grid voltages less than a predetermined value, which may be a fairly small negative voltage, which value is higher (less negative) than any voltage which the cathode of the tube 97 assumes.

When a positive saw-tooth wave is coupled to the circuit through the condenser 124, the tube 98A will conduct and a voltage will be generated in the grid leak resistor 120 of the desired saw-tooth form. The saw-tooth voltage wave formed in the plate circuit of the tube 99 will begin at a time determined by the time necessary for the saw-tooth voltage wave to drive the grid of the tube 99 to the predetermined voltage level at which the tube 99 begins to conduct, which time is determined by the negative potential of the cathode of the tube 97. When automatic variation of this potential by means of the tubes 95 and 96 is being employed, this cathode voltage will gradually rise, causing the sweep voltages produced in the plate circuit of the tube 99 to be delayed by a progressively smaller amount.

When the grid of the tube 99 reaches a certain small positive potential (at the end of the useful sweep in the plate circuit) grid current will begin to flow. This current is limited by the resistor 121, which may have a value of about 20,000 ohms. As a result of the flow of grid current, the voltage of the grid of the tube 99 and even of the cathode of the tube 98A will no longer follow the rise of voltage of the saw-tooth wave impressed upon the condenser 124. In consequence, when the sawtooth wave suddenly ends, a relatively great negative voltage will be impressed upon the anode of the tube 98A which may be more negative than the voltage of the cathode of the tube 97. The tube 98 then serves to prevent the accumulation of an excessive negative voltage at this point and to prevent the anode of the tube 98A from becoming substantially more negative than the cathode of tube 97, thereby assuring that the next saw-tooth wave of voltage excited in the circuit through the condenser 124 will begin at the voltage level set by the circuit of the tube 97. Because of the interposition of the resistor 120, the negative swing of voltage of the anode of the tube 98A and the cathode of the tube 98 which may take place at the trailing edge of the saw-tooth waves furnished through the condenser 124 produces a relatively smaller negative swing at the grid of the tube 99, so that no great period of time is needed to restore the grid of the tube 99 to the potential desired for the initiation of another sweep cycle.

The tube 100 is so connected in circuit with the tube 99 that it provides, in accordance with known principles, a voltage output opposite in polarity to that of the tube 99 but substantially equal thereto in absolute magnitude. The tube therefore acts as an inverter and amplifier. The output voltage of the tube 100 is applied to the deflecting plate 127 of the indicator 24. It will be seen that the grid of tube 100 is at ground potential. The center of the vertical sweep on the indicator tube 24 will then correspond to the moment when the grid of tube 99 is also at ground potential. Thus a persistent center-line marker can be provided by forming a signal during each sweep at the moment the grid of the tube 99 is at ground potential. The voltage pulse forming such marker can be used for time-comparison purposes during the intervals when the antenna is not looking at the target. If desired the marker line may be caused to appear at some location other than the center by causing the marker signal to occur when the grid of tube 99 passes through some predetermined voltage other than zero.

In order to form a marker signal, the grid of the tube 101 is fed in parallel with the grid of the tube 99. The bias of the tube 101 is adjustable independently of that of the tube 99 by means of the potentiometer 129. For the formation of a center marker the potentiometer 129 is to be adjusted so that the tube 101 begins to conduct when its grid is at ground potential. Adjustment of potentiometer 129 controls the vertical position of the marker line relative to the physical boundaries of the screen of indicator tube 24.

The output circuit of the tube 101 is such that sharp impulse is produced when the tube begins to conduct. This impulse is amplified and inverted by tube 102 and then passed to a cathode follower including the tube 103. The coupling condensers between the stages comprising the tubes 101, 102 and 103, have a relatively small capacitance, such as 100 and 25 $\mu\mu$ fd. respectively in order that the impulse may be sharp. The output of the cathode follower stage including the tube 103 is then coupled through the condenser 130 to the circuit of a blocking oscillator for the purpose of providing suitable marker pips for the indicator 24 as more fully explained in connection with Fig. 7.

Since it is desired to limit the indications on the indicator tube 24 to echo signal from objects lying between predetermined limits of range, which predetermined limits may differ from each other by as little as one mile, and since it is desired to vary both of these predetermined limits in the same sense during the course of an approach in order to maintain the indication of the target on the indicator tube 24, and preferably at or near the center of such tube, the saw-tooth generator 37 (Fig. 2) must be adapted to provide a linear sweep which is substantially linear over a period of time corresponding to target distances extending from a half-mile or less to the maximum range of the equipment, which may be as much as 30 or 40 miles, according to the design of the equipment. Moreover, since the level-setting circuit acts to pick off a portion of the linear sweep provided by the generator 37, such portion corresponding to a relatively small part of the original sweep, since it may correspond to a range spread of about one mile only, the amplitude of the original linear sweep is preferably made very great in order that the portion picked off by the level-setting circuit may be sufficient to cause the tubes 99 and 100 to be driven to produce a complete sweep across the indicator 24. For best operation of the apparatus, therefore, the requirements for the saw-tooth generator 37 are comparatively exacting. Circuits are known, however, which are capable of producing a high amplitude sweep of a great degree of linearity and of the desired period and one such circuit is illustrated in Fig. 10.

Figures 8, 9, 10:
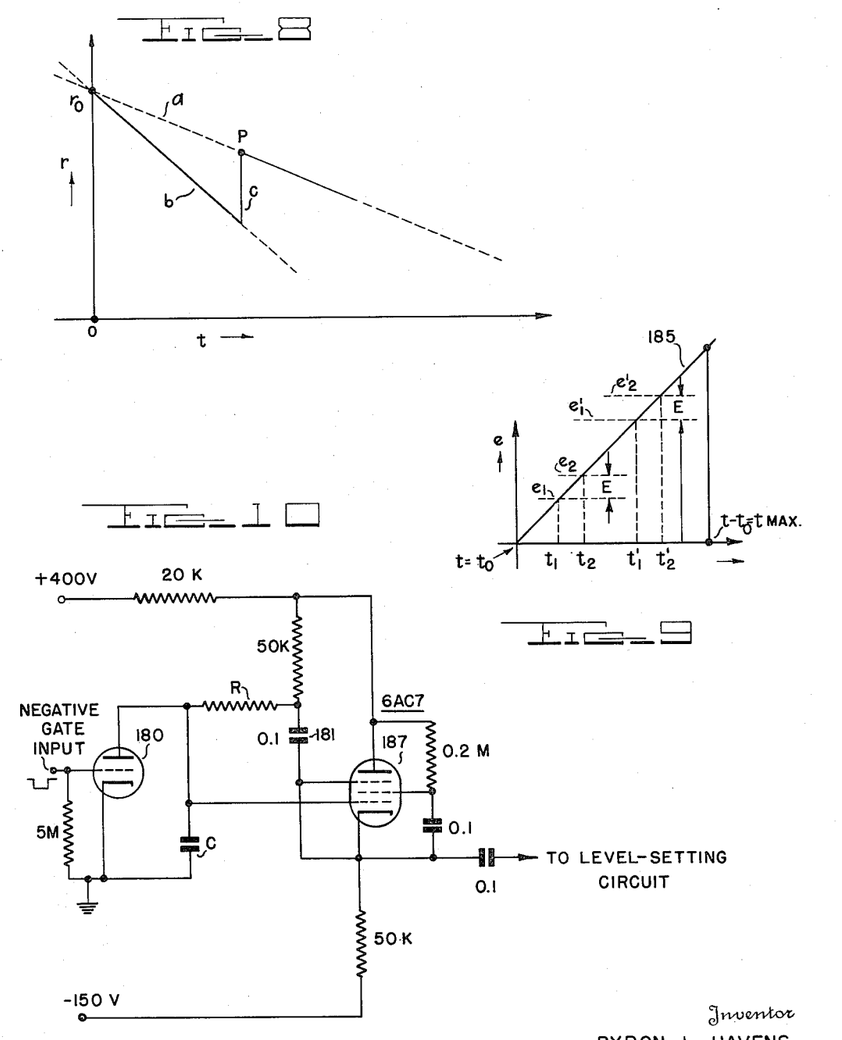
Fig. 8 is a diagram illustrating the procedure for "tracking" the target with apparatus of this invention.
Fig. 9 is a diagram illustrating the operation of the level-setting circuit shown in Fig. 5.
Fig. 10 is a circuit diagram of a type of "sweep" generator particularly suitable for feeding the range sweep voltage to the level-setting circuit of Fig. 5.

The circuit shown in Fig. 10 is capable of providing a linear sweep which is substantially linear over a useful amplitude of about 150 volts and by suitable adjustment of the resistor R and the condenser C the circuit may be provided with an appropriate time constant for service in an apparatus organized in accordance with the present invention. The vacuum tube 180 is essentially a switch tube adapted to be operated by a negative gate input which may come from the amplifier 36 (Fig. 2). Except for the duration of the input negative gate pulse, the tube 180 short-circuits the condenser C. When the negative gate pulse appears, the condenser C begins to charge through the resistor R. The condenser C may conveniently have a value of .001 $\mu$ fd. and the resistor R may conveniently have a value of 0.4 megohm, the exact values in each case being determined by the desired time constant. Constancy of the rate of charge of condenser C is maintained by feed-back action through condenser 181 from the output of cathode follower tube 187 which causes the voltage at the right-hand end of resistor R to be raised as the sweep operation proceeds. The grid of cathode follower 187 is connected to the common terminal of condenser C and resistor R. The output saw-tooth wave is obtained from the cathode of tube 187 and is then furnished to the level-setting circuit.

Fig. 9 is a diagram illustrating the function of the level-setting circuit. The line 185 represents a linear sweep, which is to say the slanting portion of a saw-tooth wave, provided by the generator 37, which may be organized as shown in Fig. 10. This wave is repeated for each pulse sent out by the radio-echo detector equipment.

At one instant during the tracking operation, the voltage provided through the wire 41 to the level-setting circuit may cause the vertical sweep on the indicator tube 24 to be initiated when the output of the sweep generator 37 reaches a voltage $e_1$, this corresponding, as shown in Fig. 9 to the time $t_1$ which bears a fixed relation to the time $t_0$ when the linear sweeps began. The time $t_0$ may be the instant at which the radio pulse was transmitted. When the saw-tooth wave represented by line 185 reaches the voltage $e_2$, the sweep on the indicator tube 24 will be completed, since the indicator tube 24 is intended to show only targets lying within certain narrow limits of range (whose echoes will therefore be received within certain narrow limits of time, namely between $t_1$ and $t_2$). At the end of the useful sweep produced by the tubes 99 and 100 (Fig. 5) grid current will flow through the limiting resistor 121 and the amplifier circuit 99 and 100 will cease to follow the waves produced by the saw-tooth generator, although the latter will continue to operate, as shown in Fig. 9. If now the voltage of the level-setting circuit is changed from a value corresponding to $e_1$ to a value corresponding to $e'_1$, the vertical sweep on the indicator tube 24 will be displaced in time with respect to $t_0$ and will take place between the intervals $t'_1$ and $t'_2$. Because of the linearity of the sweep represented by the line 185, the time interval of the vertical sweep on the tube 24, which is in this case $t'_2-t'_1$ will be unchanged by the change of the control voltage applied to the level-setting circuit, which is to say that it will be equal to $t_2-t_1$, and likewise the amplitude E of the sweep will be substantially unchanged. As previously pointed out, a marker signal will be produced at the center of the sweep provided to the vertical deflecting plates of the tube 24, so that in the instance first described the marker would occur at an instant half way between $t_1$ and $t_2$ in time and in the second instance described the marker pip would occur at an instant half way between $t'_1$ and $t'_2$ in time.

It will thus be seen that if the z-control voltage provided through the wire 41 to the level-setting circuit varies at some rate other than that which corresponds to the approach of the aircraft to the target, the indication of the target echo on the indicator tube 24 will be displaced more or less gradually with respect to the marker line formed by the marker-pip signal.

In order to maintain the target indication of the marker line so that the marker line may continuously represent the position of the target and so that the corresponding marker signal may serve both purposes of range comparison and tracking rate comparison, it is necessary to adjust the potentiometer 115 to the correct value. By virtue of the characteristic manner in which this potentiometer is organized in circuit with other elements (which characteristic manner may also be adapted for use with generators of long-period voltage changes of the motor-driven potentiometer type, or the like) it is possible to obtain reliably and rapidly a satisfactory setting of potentiometer 115 for tracking the target. The operation of the circuit in this regard is illustrated in Fig. 8.

At the beginning of the tracking operation potentiometer 106 is adjusted to bring the marker line on the target indication of the indicator tube 24. In terms of Fig. 8, which plots the range $r$ against time, this corresponds to setting $r_0$ at a given value. At the instant for which this adjustment is made the range represented by the time-phase position of the marker signal and the range of the target will be equal. At this stage of the operation the potentiometer 115 may have any desired setting, such as an arbitrarily estimated setting. On Fig. 8, the time at which $r_0$ is determined is indicated as 0 on the time axis. From that time on, the range of the target and the range represented by the time-position of the marker line will decrease at different rates during the approach, unless by some coincidence the setting of potentiometer 115 happens to be exactly that which will track the target. In the hypothetical case illustrated by Fig. 8 the change of range of the target is indicated by the line $a$ and the change of the value of range indicated by the time-phase position of the marker line is shown by the line $b$. The line $a$, as well as the line $b$, is indicated as a straight line, since as has previously been pointed out, the decrease in range is substantially linear for low altitude bombing approach, so far as the bombing problem is concerned. Because of the initial setting, at $t=0$, of the target indication on the marker line, both lines $a$ and $b$ will intersect in the point $r_0$.

After the divergence of the lines $a$ and $b$ becomes noticeable as a result of the target indication drifting away from the position of the center line of the indicator tube 24, the potentiometer 115 may then at any convenient time be readjusted to bring the target indication back on the center line. The performance of this operation, because of the fact that the adjustment of the potentiometer 115 varies both the displacement of the indication and the rate of displacement of the indication in the proper proportion, will correspond to going over from the line $b$ to the line $a$ by way of the path $c$ shown on Fig. 8. This operation not only brings about the displacement indicated by the line $c$ but at the same time adjusts the rate of change of the range corresponding to the time-phase position of the marker signal to the value which would have brought the range indicated by such time-position of the marker signal to the value of $P$ at the corresponding time indicated on Fig. 8, which is to say, that further changes in the range corresponding to the time-position of the marker line will take place along the line $a$. It will be seen that bringing the target indication to the marker line by adjustment of the potentiometer 115 in this manner, whether done once or repeatedly will automatically adjust the rate of change of the range represented by the time-position of the marker signal to the value corresponding to the average displacement of the aircraft with respect to the targets over the period between the initial setting corresponding to the point $r_0$ and the time of the final adjustment.

The potentiometer 106 is normally used only for the initial setting, for although it could be used to bring the marker line onto the target its use in this fashion would leave the rate of change of the range represented by the time-position of the marker signal unchanged. Thus, once the initial setting has been made, determination of a satisfactory setting for a potentiometer 115 may in usual practice be made by adjustment of the potentiometer 115 alone. This constitutes a substantial advantage over previous tracking techniques employed in bombing calculators, in which simultaneous adjustment of separate displacement and rate controls at a predetermined time after the initial setting was generally necessary. As previously pointed out, the rate adjustment technique involved in this invention does not require the use of a generator of long-period linear voltage change of the particular form shown in Fig. 5, but may be utilized in connection with other types of generators of long-period linear voltage change. The output of such other type of generator may be regulated through potentiometers organized in a manner substantially analagous to the arrangement of the potentiometer 115 and the associated potentiometer 106.

The tracking technique described above may also be used in conjunction with a physical hair-line marked on the indicator tube 24 instead of the luminous line provided by the marker signal. Such a hair-line will also correspond to a particular value of range and consequently to a particular time relation to the transmitted pulses, such value being determined and varied by the level-setting circuit just as in the case of the luminous marker line.

It is to be noted that the position of the control shaft of the potentiometer 115 will, when such potentiometer has been adjusted as aforesaid, indicate the rate of approach. Such indication may be utilized for furnishing rate of approach information to the bomb-sight computer for the purpose of determination of the appropriate moment for releasing a bomb. The information may be transmitted to the bomb-sight calculator by well-known means. The bomb-sight calculator will usually be adapted to form the product of the rate of approach and the time of fall of the bomb and to subtract from this product another quantity known as the "trail." Both the time of fall and the trail depend upon the altitude of the aircraft and the characteristics of the particular type of bomb. These values may be set into the bomb-sight calculator by the operator of the device. The bomb-sight calculator will also generally take account of the effect of cross-drift, this effect being determinable at the same time as the collision course is computed. Since the particular manner of organization of the bomb-sight calculator is not of great importance to the present invention, no further description will be made thereof, although the circuits which may be used for providing automatic release of the bomb at the time calculated with the bomb-sight calculator will be described in full.

Figure 6:
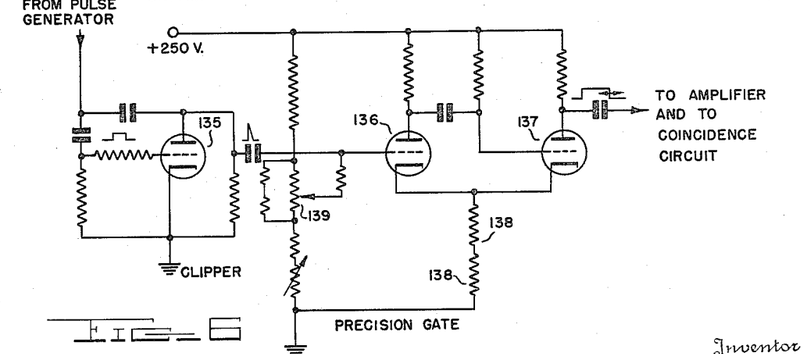
Fig. 6 is a circuit diagram relating to the portions of Fig. 2 indicated on Fig. 2 by the terms "clipper" and "precision-adjustable gate"

Fig. 6 shows a suitable circuit for the adjustable precision gate shown in Fig. 2 at 51. The adjustable gate circuit is preceded by a clipper circuit including the tube 135, which serves to transform the rectangular pulse produced by the pulse generator 35 into a sharp trigger impulse, which is fed to the precision gate circuit.

The gate circuit, which might also be called a "flip-flop" circuit and is sometimes referred to as a special type of multivibrator, includes two vacuum tubes 136 and 137 coupled through a common cathode resistance 138. The tube 136 is normally cut off and the tube 137 is normally conducting, but when a trigger pulse is presented on the grid of the tube 136, the tube 136 will conduct and the tube 137 will be cut off for a period of time which is adjustable with a practically linear relationship through the manipulation of the potentiometer 139. After such a period of time the normal condition will be suddenly restored, the tube 136 being cut off and the tube 137 conducting.

The potentiometer 139 may thus be adjusted to correspond with the distance from the target at which it is desired to release a bomb. This distance may be obtained by the computing operation of the bomb-sight and, if desired, the potentiometer 139 may be automatically set by the operation of the bombing calculator.

Since the indication of the target on the tube 24 is normally kept on the marker line furnished by the tubes 101, 102, 103 and the blocking oscillator 40, the first moment when the marker pip produced by the blocking oscillator 40 occurs at the same time phase of the period of the pulse generator 35 as any part of the positive gate pulse produced by the precision gate circuit 51 will be the moment appropriate for releasing the bomb. The determination of this moment is performed by a coincidence circuit shown in Fig. 7. The function of the marker pip in this coincidence circuit may also, if desired, be accomplished by the echo signal itself, suitably amplified, although the use of the marker pip is to be preferred because the echo signal occurs only when the antenna is looking towards the target. In the circuit shown in Fig. 7, a selector switch 140 is provided which permits operation of the coincidence circuit either with the marker pip or with the amplified echo signal.

Figure 7:
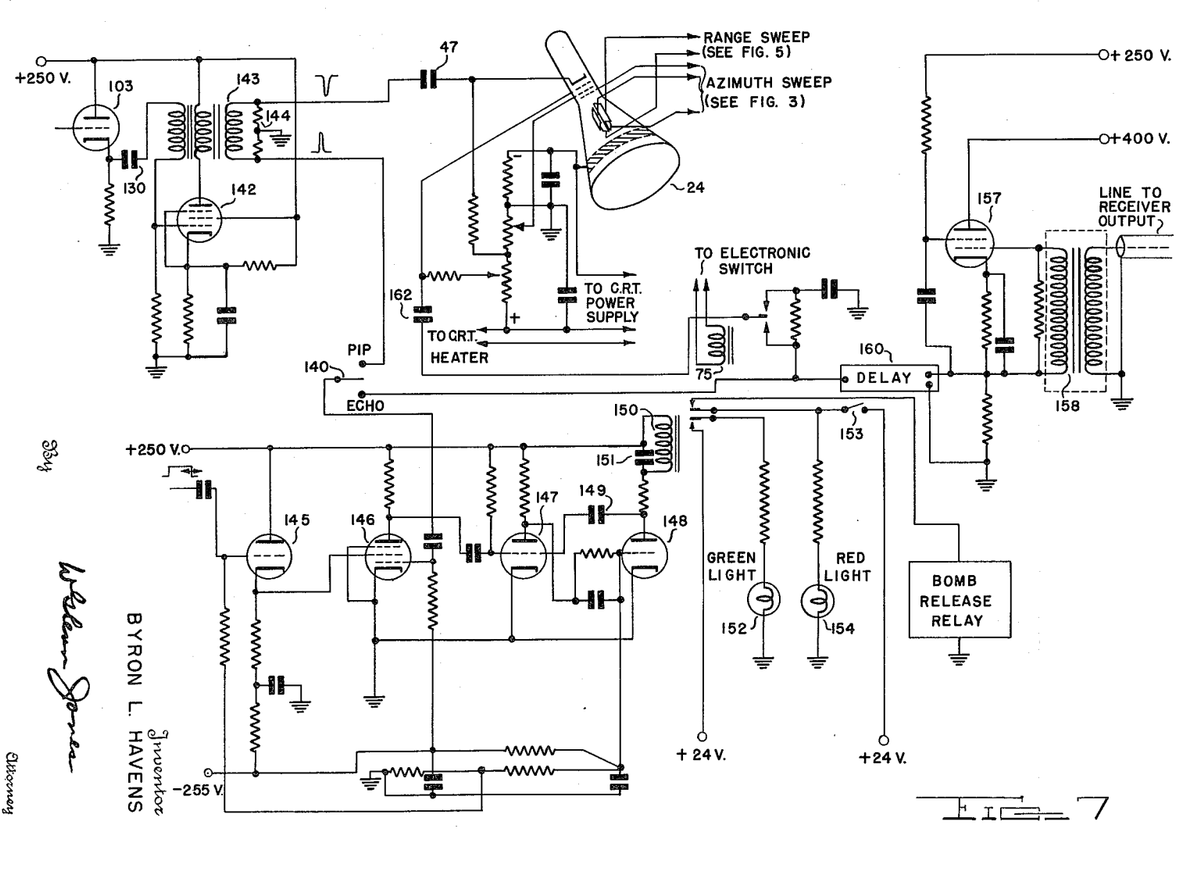
Fig. 7 is a circuit diagram relating to other portions of the apparatus shown in Fig. 2, including a blocking oscillator, a coincidence circuit, and certain special amplifier circuits.

The blocking oscillator circuit shown in Fig. 7 at the upper right and including the tube 142 is substantially in accordance with conventional design. The output winding 143 of the transformer used in the circuit is provided with a center tapped resistor 144, the center tap of which is connected to ground, in order that the output pip or impulse may be divided into two simultaneous impulses of opposite polarity with respect to ground. The transformer should be capable of passing relatively sharp pulses. The negative impulse is fed through the condenser 47 to the cathode of the indicator 24, as previously mentioned in connection with Fig. 2. The positive impulse output is connected to one contact of the switch 140, from which it may be connected to the coincidence circuit now to be described.

The output of the adjustable gate circuit is fed to a cathode follower stage including the tube 145, which controls the screen-grid voltage of a multiple-grid vacuum tube 146. Echo signals or marker pips are connected through the switch 140 to the normal control grid of the tube 146 and the tube 146 is so biased that it is substantially cut off except when a positive pulse is present both on the normal control grid and on the screen grid.

The output of the tube 146 is fed to a circuit comprising the tube 147 and 148 which may be described as a gate type of circuit adapted to produce, upon being activated, a pulse of duration longer than the marker pip. The tube 147 is normally conducting and the tube 148 is normally non-conducting. When the tube 146 conducts, a negative impulse is produced and fed to the grid of the tube 147, which is then cut off, causing the tube 148 to conduct. After a predetermined period of time, depending upon the values of capacitance and resistance in the circuit, the tube 148, acting through the condenser 149, will cause the tube 147 to conduct again, thus cutting off the tube 148, after which the circuit will remain in normal quiescent condition until another pulse is produced by the circuit of the tube 146.

As the desired bomb release point is approached, the time phase of the marker pip will approach the "trailing edge" of the adjustable gate. When the desired point is reached the tube 146 will conduct upon each marker pip, thus producing a continuing series of impulses. In consequence, the tubes 147 and 148 will produce a series of relatively long pulses, which in turn will furnish sufficient current to the relay 150 to operate such relay. The relay winding 150 is provided with a by-pass condenser 151 in order to smooth out the current through the relay. The operation of the relay 150 is adapted to turn off a green light 152, and to operate the bomb release relay mechanism (e. g. to operate a suitable solenoid in the bomb release mechanism). A switch 153 is provided in the bomb release circuit in order to disable the bomb release circuit when desired, and a red light 154 is provided to indicate when the switch 153 is closed.

The video-frequency amplifier stage of the receiver, which is essentially a cathode follower circuit feeding the signal grid of the indicator tube 24, is also shown in Fig. 7. The video frequency output of a suitable detector or amplifier stage of the receiver is fed to the grid circuit of the tube 157 through a wide-range transformer 158. The tube 157 is preferably a power-amplifying type of tube such as a tetrode or pentrode having beam-forming electrodes and also aligned grids. The cathode circuit output of the tube 157 is coupled to a delay line 160 of any conventional type. The use of the delay line 160 makes it unnecessary to energize the pulse generator controlling the sweep circuit at a time previous to the operation of the transmitter 10 sending out a pulse of radio energy. If a synchronizing circuit is used which delays the operation of a transmitter 10 until a suitable time after the sweep circuit synchronizer has been activated, the delay line 160 in the receiver output may be eliminated. The output of the cathode follower stage, after passing through the delay 160 is then connected to a signal (intensity modulation) grid of the indicator tube 24, through the contacts of relay 75 and a suitable coupling condenser 162, the connection being established only during those moments when the relay 75, controlled by the electronic switch circuit shown in Fig. 3, is energized.

The mode of operation of the apparatus of the present invention is well adapted for effective use by the personnel of military or naval aircraft. The bombardier of the craft, having found a target either by direct visual observation, observation of the indicator 24, or manipulation of the controls of the indicator 24 (the potentiometer 106 in one coordinate and the orientation of the bombing sight in the other coordinate) in accordance with instructions from a person observing the auxiliary indicator 25, thereafter keeps the telescope 27 of the bombing sight 30 trained on the target, preferably by keeping the indication of the target in the indicator 24 located on the center line of the said indicator, although optical methods of following the target may also be used. If the preferred method of training the sight on the target is used, it is not necessary for the bombardier to look through the telescope 27, it being only necessary for him to use it or some other control as a centering control for the indicator 24, at the same time operating the computing mechanism of the bombing sight thereby. Except for the fact that the bearing of the telescope 27 or its equivalent is controlled by reference to the indication appearing on the indicator 24, the operation of the bombing sight may be carried out in substantially the same way as in the case of ordinary approach controlled by direct visual observation. The collision course determined by operation of the bomb-sight mechanism is furnished to the pilot on the course indicator 31 in the usual way.

It may be desirable to provide the indicator 25 (Fig. 1) with means to show the area which is covered by the indicator 24, in order that it can readily be checked whether the desired one of a number of echo-producing objects is being tracked, when several such objects are observed. Such means may be provided in any of a number of ways known to the art.

It will usually be found convenient to employ a homing approach to the target until the attacking craft is within about 15 miles of the target. Thereafter, the collision course may be flown. The above-described adjustments may then be made for tracking the signal in range on the indicator 24 so that it remains on the horizontal center line furnished by the marker pip. When a suitable adjustment is reached, the speed of approach is noted and entered into the computing mechanism of the bombing-sight apparatus, or else transmitted automatically thereto. The distance from the target at which it is desired to release the bomb is then determined and a corresponding adjustment of the circuit of the precision gate is made (with the potentiometer 139) either manually or automatically. When these adjustments are completed the switch 153 may be closed. The bomb will then automatically be released at the desired instant. If the target should make a sudden change of course, or if some other circumstances should arise requiring a change of procedure, the switch 153 may be opened to prevent the bomb from being released by the automatic apparatus, after which manual control of the bomb release may be substituted, or a new approach made with a readjustment of the automatic mechanism in accordance with the new conditions.

It is to be understood that for purposes of blind approach an automatic following system may be used to keep the orientation of the bomb-sight such that the indicated signal on the indicator 24 remains on the vertical center line of the indicator tube. For this purpose either a photoelectric following system associated with the indicator tube or suitable electronic coincidence circuits associated with the azimuth sweep circuits of the tube may be used. Likewise, automatic circuits may be devised for setting the potentiometer 115 at the proper value to keep the received signal substantially on the horizontal center line of the indicator tube once an initial approximate setting has been made. Such refinements, however, provide additional complication, weight and power consumption of the apparatus which in many cases are not justified by such additional convenience as may result, though in other cases they are useful.

Although the apparatus of the invention has been described in connection with the bombing of targets from aircraft, it is to be understood that apparatus of the invention might also be used for other purposes such as the launching of torpedoes from high-speed torpedo boats. By means of apparatus according to the present invention, accurate launching of torpedoes in the night time from fast moving torpedo boats attacking enemy vessels can be provided.

What I desire to claim and secure by Letters Patent is:

1. Apparatus for determining a collision course between relatively moving craft including, on one of said craft, a radio-echo locating system having a continuously scanning directive antenna system, a bombing calculator manually steerable in azimuth, and having a shaft the rotational position of which is adapted to represent the angular bearing of an object, such as the other of said craft, variable transformers associated respectively with said antenna system and said shaft, an indicator adapted to present information to a person operating said calculator, means associated with said variable transformers and said indicator for providing on said indicator echo signals from a selected portion of the scan of said antenna system and for selecting said selected portion in accordance with the manual steering of said calculator in a manner such that a center line on said indicator corresponds with the rotational position of said shaft.

2. Apparatus according to claim 1 including, in association with said indicator, means for producing a delayed sweep deflection adapted to cause said indicator to indicate only targets lying within selected limits of range, means for producing on said indicator a reference line indicating substantially the middle of said sweep deflection and means for controlling the delay of said sweep deflection.

3. Apparatus in accordance with claim 1 in which the radio-echo locating system includes means for producing a delayed sweep deflection adapted to cause said indicator to indicate only targets lying within selected limits of range, rate generator means adapted to produce a gradual change of said limits at a controllable and substantially uniform rate, a switch for activating said rate generator means at a desired time, and a manually operable control of at least the average value of said limits adapted for control of said limits when said rate generator means is not activated.

4. Apparatus in accordance with claim 3 including means adapted to generate marker signals adapted to generate a luminous marker at the center of each of said delayed sweeps on said indicator and means for comparing the time-phase position of said marker signals with a time interval set in accordance with calculations performed by said bombing calculator.

5. Apparatus in accordance with claim 3 in which said rate generator means adapted to produce a gradual reduction of said limits of range includes a rate control adapted simultaneously to control the rate of reduction of said limits and to displace said limits in such a manner that said limits thereafter take values for continuance of a "tracking" operation which are the same as the values which would have been taken at the corresponding time if said rate had at the initiation of the "tracking" operation been set at the value later set in during said operation, the initiation of a "tracking" operation being defined as the adjustment of the control specified in claim 2 to bring the indication of an echo to a predetermined point or line on the indicator immediately followed by activation of the said rate generator means.

6. Apparatus for determining a collision course between relatively moving craft including, on one of said craft, a radio-echo locating system having a rotatable directive antenna system, a bombing calculator having a control shaft stabilized against yaw of said craft adapted to be set in terms of the true relative bearing of the other of said craft and having also a second shaft adapted to represent the angular bearing of said other craft relative to the orientation of said first-mentioned craft, translating means associated with said antenna system and translating means associated with said second shaft adapted to cooperate to select a portion of space scanned by said antenna for expanded representation on a cathode ray tube indicator in a manner such that echoes from objects having a true relative bearing corresponding to the setting of said control shaft will be represented substantially on the vertical center line of said cathode ray tube.

7. Apparatus for radio-echo locating and detecting including a transmitter, a receiver and a directive antenna system, said transmitter being adapted to transmit short-duration pulses of radio energy and said receiver being adapted to receive echoes of said pulses, means for continuously changing the orientation of said antenna to scan a portion of space, a first variable transformer having one winding adapted to be fed by a source of alternating current and a second winding connected to a winding of a second variable transformer, a second variable transformer having one winding connected to said second winding of said first variable transformer and a second winding connected in series with said source and with an output circuit, means mechanically connecting said antenna and said first variable transformer adapted to produce a modulation of said alternating current substantially proportional to the sine of an integral multiple of the angle between the orientation of said antenna and a reference axis determined by the condition of said second variable transformer, means for adjusting said second variable transformer to vary the orientation of said reference axis, and means including an indicator for producing an indication of echoes received by said receiver during a selected portion of the scanning cycle of said antenna and adapted in cooperation with said output circuit to control the location of said indication with reference to one axis of indication in accordance with said modulation.

8. Apparatus according to claim 7 in which said first variable transformer is adapted to revolve through an integral number of revolutions greater than one for each complete revolution of said antenna, and which includes means for disconnecting said receiver from said indicator for all but at most one revolution of said variable transformer for each scanning cycle of said antenna.

9. Apparatus according to claim 7 in which the selected portion of the scanning cycle of said antenna is a portion covered during periods of relatively great slope of the envelope of said modulation.

10. Apparatus for radio-echo locating and detecting including a transmitter and a receiver and a directive antenna system, said transmitter being adapted to transmit short duration pulses of radio energy and said receiver being adapted to receive echoes of said pulses, means for continuously rotating said antenna in a manner adapted to change the orientation of the directivity pattern of said antenna, a first variable transformer having one winding adapted to be fed by a source of alternating current and a second winding connected to a winding of a second variable transformer, a second variable transformer having one winding connected to said second winding of said first variable transformer and a second winding connected in series with said source and with an output circuit, means mechanically connecting said antenna and said first variable transformer adapted to produce a modulation of said alternating current substantially proportional to the sine of an integral multiple of the angle between the orientation of said antenna and a reference axis determined by the condition of said second variable transformer, means for adjusting said second variable transformer to vary the orientation of said reference axis, means including an indicator for producing an indication of echoes received by said receiver and adapted to control the location of said indication with reference to one axis of indication in accordance with said modulation, and means for disconnecting said receiver from said indicator for all but at most one revolution of said variable transformer for each revolution of said antenna.

References Cited in the file of this patent

UNITED STATES PATENTS 2,406,358   Doba, Jr. _______________ Aug. 27, 1946